Nov. 8, 1938.  L. N. MARKWOOD  2,135,551
FUNNEL HEATING DEVICE
Filed Sept. 24, 1936

Inventor
L. N. MARKWOOD
By [signature]
Attorney

Patented Nov. 8, 1938

2,135,551

UNITED STATES PATENT OFFICE 2,135,551

FUNNEL HEATING DEVICE

Louis N. Markwood, Washington, D. C.

Application September 24, 1936, Serial No. 102,333

8 Claims. (Cl. 226—29)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without the payment to me of any royalty thereon.

The invention herein described is a means for effectively and simply heating a funnel. Many operations of a chemist or laboratorian require that the funnel through which solutions are to be filtered be heated during the operation of filtration. This is especially true in the field of organic chemical preparations where a frequent standard procedure is to filter hot concentrated solutions of an organic compound dissolved in a solvent such as alcohol, toluene, chloroform, etc. Unless the solution be maintained hot during filtration a portion of the solute will separate out, thereby clogging the filter and totally preventing the passage of the fluid.

Several devices for heating funnels are known. Some of these consist of rubber or metal coils wrapped around the funnel, through which hot water or steam is passed. Others are of the metal-jacket type, wherein an air chamber is heated by gas heat, or where a body of water enclosed in a double-walled jacket is heated by a gas burner under the funnel. Still another type consists of a double-wall all-glass funnel in which the outer wall is permanently sealed to the funnel proper.

All these types are awkward and cumbersome, as well as expensive, and the efficiency of heat transfer in most cases is low. Furthermore, the use of gas-heated devices is always dangerous in the presence of flammable solvents, which are commonly used in chemical operations.

These disadvantages do not exist in the present device. It is small and compact, taking up but little more space than the funnel itself, and is of such simple construction as to be inexpensive. The efficiency of heat transfer from the heated medium—be it steam, hot water, or other hot fluid—to the funnel, is high because, as is shown in the drawing, the heat transfer medium comes in direct contact with the funnel. As a result the funnel is heated to practically the temperature of the medium in a very short time, and the funnel temperature is maintained at this degree of heat throughout. Other advantages, such as detachability, non-breakableness, and adaptability to filter flasks will be apparent from the construction.

The device is made preferably of rubber, but it may also be made of any other suitable material, such as Duprene, asbestos, metal, glass, or compositions of material which are resistant to the heating medium. In constructions other than a resilient material like rubber, the device is suitably gasketed to the inner funnel to provide a tight connection.

The construction and manner of fitting will readily be understod by reference to the drawing, in which.

Similar numerals refer to similar parts throughout the several views.

Figure 5:
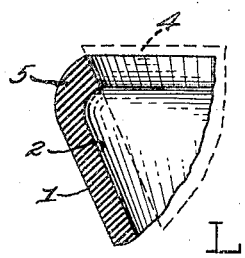
Figure 5 is a cross-section illustrating an alternate suitable shape of the rim of the device for providing closure at the upper end of the funnel.

The thickness of the wall 1 is sufficient to impart strength and permit resilience, being approximately $\frac{1}{8}''-\frac{1}{4}''$. The inside wall 2 is spaced at a distance from the funnel of approximately $\frac{1}{4}''$. The lower end 3 consists of the usual stopper form of rubber stopper with a hole to make a snug fit between rubber and stem of funnel. The top is open to receive the bell of the funnel and make a tight connection therewith by means of the flange or rim 5, which is rounded or may be of any cross-section so as to make a fluid-tight connection. A section of suitable design for this purpose is shown in Figure 5. Inlet and outlet nipples 6 and 6' for the heat transfer medium are provided as shown, although they may be disposed relative to each other in other ways, for example, on the same level for gaseous fluids. These nipples are of rubber integral with the main body of the device. The inside height 7 of my device is so chosen that the rim 5 comes close to the rim of the glass funnel 4 while the pit 8 comes just below the steam juncture 9 of the glass funnel 4. In this way practically the entire outer surface of the glass funnel 4 is subjected to the heating medium, and, it is emphasized, the hot medium impinges directly against the funnel 4. The bore 10 of the lower part 3 is of such diameter as to make a fluid-tight friction seal with the stem of the funnel. The external diameter 11 of the lower part 3 may be of any suitable magnitude from a size slightly greater than 10 to one several times greater. Since the lower part 3 is adapted for entrance into a filter flask, for filtration under reduced pressure, the diameter 11 may be of such size as will be accommodated by the filter flask. But since there is a variation in the neck size of different filter flasks a narrow rather than a large diameter is preferably employed, and a larger bored-out stopper can then readily be slipped over the part 3 whereby tight connection can be made with any size of filter flask.

Figure 1:
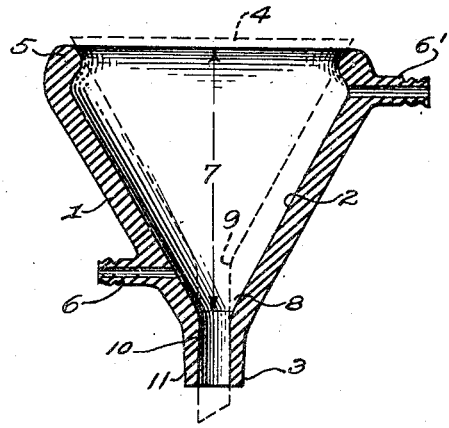
Figure 1 is a cross-section of the device or attachment, made of rubber, with the funnel inserted in position.
Figure 2:
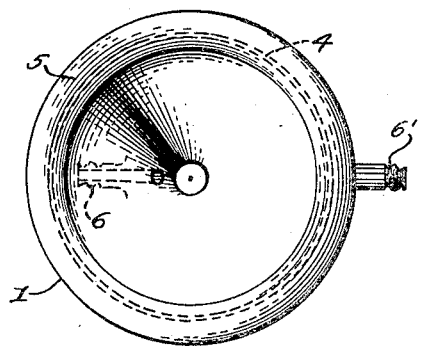
Figure 2 is the top view of the device.
Figure 3:
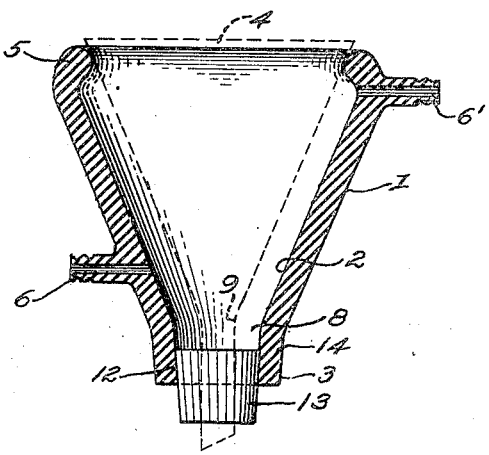
Figure 3 is a cross-section of a modified form open at the bottom, to be used in combination with a resilient connection, and further explained below.

All parts of the device shown in Figures 1, 2, 3 and 5, are made of rubber or other resilient material and it is formed or molded preferably in one piece, except that in Figure 3 a connection 13 is included. Its resistance to hard wear is thus insured. To attach the device to a funnel the stem of the latter is simply inserted downward into the bore of the part 3 until the outer funnel surface and the rim 5 make tight contact. By virtue of the resilient nature of rubber and the compression set up by the frictional resistance of the stopper bore on the stem of the funnel, no escape of heating fluid occurs. The device is self-locking. It is understood that any grade of rubber or similar elastic material which has the necessary resilience, rigidity, and strength may be employed. It is also understood that slight structural modifications may be resorted to, such as the inclusion of horizontal or vertical ribs in the conical portion of the device to impart added strength or tighter fit.

Figure 3 in the drawing illustrates a cross-section of a modified form of the device, fitted with a funnel 4 wherein the lower part 3 is eliminated leaving the open end 12 into which is inserted a separate connection 13. This manner of construction is advantageous where the device is to be used with funnels having quite different stem diameters. A different connection 13 of suitable bore can be employed for each funnel. The connection 13 serves the triple purpose of providing the seal between the inner surface of the flange 14, and the funnel stem 9; carrying the stem 9 of the funnel 4; and connecting with the filter flask (not shown). When the connection 13 carrying the funnel stem 9 is pushed into the opening 12 a fluid-tight chamber is formed about the funnel 4.

Figure 4:
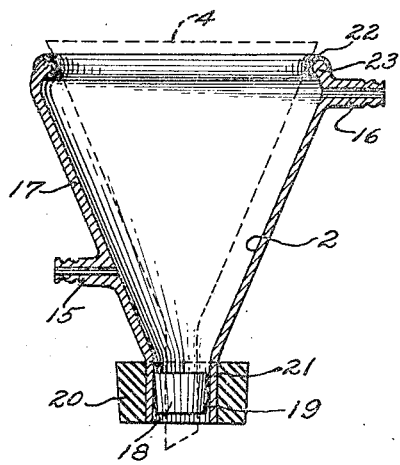
Figure 4 is a cross-section of a modified form made of non-resilient material, to be used in combination with resilient gaskets, and further explained below.

Figures 1, 2, 3, and 5 illustrate a funnel-heating device of the nature described which is made of rubber or other resilient material. The same form or pattern may also be utilized as stated with suitable non-resilient materials, such as metal, asbestos, glass, or compositions, such as Bakelite. In these cases rubber or other resilient gaskets are provided at top and bottom to make fluid-tight joints with the glass funnel. These gaskets may be permanently joined to the contiguous part of the device or may be detachable. Figure 4 shows a cross-section of such a device made of metal, with the inner funnel in position. The nipples 15 and 16 are made of the same metal as the conical part 17 and are affixed thereto. The rubber connection 18 serves to close the opening 19 and to carry the funnel stem. By increasing the length of said connection 18 it can also serve to connect with a filter flask (not shown). However, more advantageously, a second rubber connection 20 with a hole bored in it to carry the outer surface of the flange 21 is provided for this purpose. The object in providing this double connection arrangement is to shorten the stem and so lessen the possibility of crystallization from the liquid after the latter passes the zone of direct heat. A rubber gasket 22, similar to an ordinary rubber band, is drawn around the upper rim 23 and provides the cushioning effect for metal against glass, as well as effectively sealing in the heated fluid.

Having thus described my invention, what I claim for Letters Patent is:

I claim:
1. A heat transfer device, comprising a substantially conical receptacle of resilient material, having openings formed therein, and inlet and outlet means formed therewith, and adapted to hold a funnel and to substantially restrict the flow of circulating fluid between said receptacle and a funnel.

2. In a heat transfer device having a substantially conical receptacle of resilient material with openings formed therein, and inlet and outlet means formed therewith, and adapted to hold a funnel and to control the circulation of heated fluid between said receptacle and a funnel, and an integral connection at the basal terminus of said receptacle.

3. In a heat transfer device having a substantially conical receptacle of resilient material with openings formed therein, and inlet and outlet means formed therewith, and adapted to hold a funnel and to control the circulation of heated fluid between said receptacle and a funnel, and adapted to carry a connection at the basal terminus of said receptacle.

4. A funnel-heating device of resilient material capable of confining an externally heated circulating fluid in direct contact with said funnel by closure between contiguous portions of said device and said funnel, closure being maintained by the natural resilience of the material of said device.

5. A funnel-heating device capable of confining an externally heated circulating fluid in direct contact with said funnel, comprising a conical form of resilient material fitting tightly against the upper end of said funnel, open at the lower end, and adapted at the lower end for insertion of a bored stopper.

6. A funnel heating device comprising a substantially non-resilient jacket adapted to be disposed about the outer surface of a funnel providing an annular space between said funnel and said jacket, resilient means for hermetically sealing said funnel to said jacket at the upper rim of said jacket and at the stem of said funnel, and means for circulating a fluid in said annular space.

7. In combination with a funnel, a funnel heating device comprising a conical jacket of a non-resilient material adapted to be disposed about the outer surface of said funnel, a resilient gasket between the upper rim of said jacket and the bell of said funnel, and a resilient connection between said jacket and the stem of said funnel, an inlet and an outlet for circulating a fluid between said jacket and said funnel.

8. A funnel heating device comprising a substantially non-resilient jacket adapted to be disposed about the outer surface of a funnel providing an annular space between said funnel and said jacket, and resilient means for removably sealing the bell and stem of said funnel to the upper rim and lower portion of said jacket, respectively, and means for circulating a fluid in said annular space.

LOUIS N. MARKWOOD.